Dec. 20, 1938.  C. W. SPICER  2,140,723
SELF-PROTECTING CLUTCH AND DRIVE MECHANISM
Filed Sept. 10, 1936   2 Sheets-Sheet 1
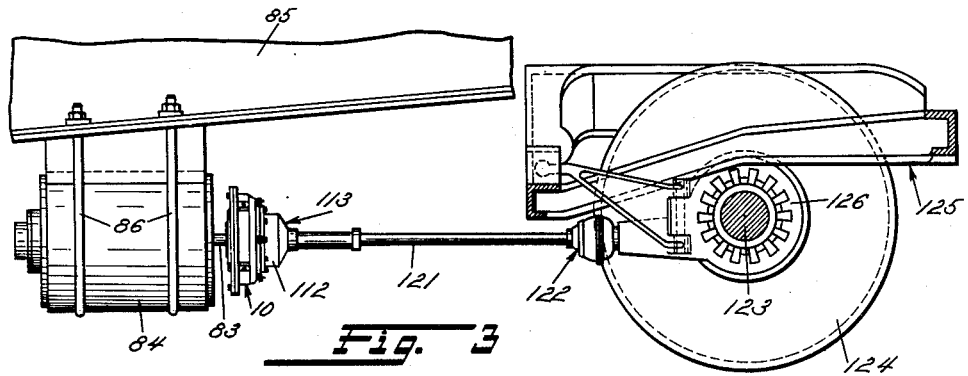
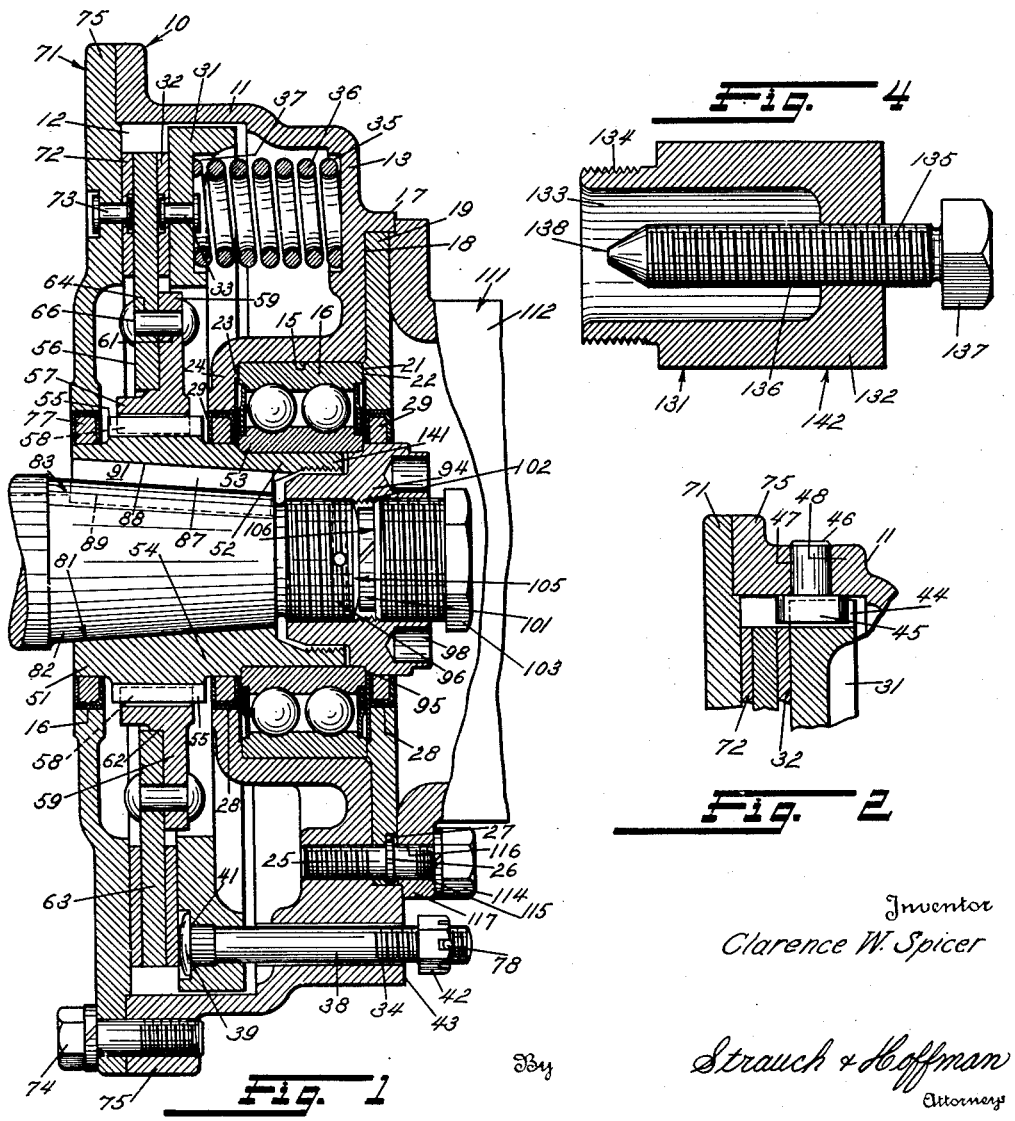
Inventor
Clarence W. Spicer
By Strauch & Hoffman
Attorneys Dec. 20, 1938.   C. W. SPICER   2,140,723
SELF-PROTECTING CLUTCH AND DRIVE MECHANISM
Filed Sept. 10, 1936   2 Sheets-Sheet 2

Inventor
Clarence W. Spicer

By Strauch & Hoffman
Attorneys

Patented Dec. 20, 1938

2,140,723

UNITED STATES PATENT OFFICE 2,140,723

SELF-PROTECTING CLUTCH AND DRIVE MECHANISM

Clarence W. Spicer, Toledo, Ohio, assignor to Spicer Manufacturing Corporation, Toledo, Ohio, a corporation of Virginia Application September 10, 1936, Serial No. 100,191

5 Claims. (Cl. 64—28)

This invention relates to improved clutch and drive mechanisms of the character used for driving generators, compressors, refrigeration machinery and the like employed on refrigerator cars, Pullman cars or other railway rolling stock.

More particularly the present invention relates to a novel safety clutch designed for use in a direct drive of the above mentioned character wherein the source of power comprises a wheel or axle of the vehicle upon which the auxiliary unit is mounted. The generator or like unit is accordingly started and stopped as the vehicle is started and stopped. It is, therefore, desirable to provide a direct drive unit which is as light as possible, to lessen inertia and lighten the added demand on the tractive unit when starting, but which is capable of withstanding predetermined overloads incident to normal operation, yet, which will disrupt the driving connection when truly excessive and prolonged loads incident to abnormal operation are encountered.

It is, therefore, the primary object of the present invention to provide a direct drive from a wheel or axle of a railway or like vehicle to an auxiliary unit such as a generator, compressor or the like, wherein the drive is light, strong enough to withstand normal or temporary overloads, yet, which will automatically release if abnormal excessive loads are encountered.

Attempts have been made to improve old or existing drives by providing, for example, frangible driving pins which are designed to shear when an undesirable overload of a predetermined magnitude is encountered. These drives, however, are unsatisfactory since the frangible pins are often sheared when normal overload equal to the predetermined magnitude are momentarily encountered. As an example, a normal overload of the character last mentioned would often result when a car is being coupled.

A further major object of this invention, therefore, resides in providing a clutch, for use in a drive of the character mentioned, with a torque transmitting member including connecting elements designed to withstand normal excessive loads but which will be automatically severed when abnormal excessive loads, such as excessive loads of long duration, are encountered. More specifically, an object of the present invention resides in providing a clutch with a torque transmitting member formed by two or more sections connected by special rivets designed to soften when excessive heat is generated by slippage of the clutch due to the imposition of abnormal loads, thereby disrupting the driving connection and preventing major injury of the parts of the drive mechanism or the auxiliary unit driven thereby.

Another object of the present invention resides in the provision of a clutch utilizing higher pressures on the friction surface, due to the fact that it is a simple spring loaded clutch which is seldom used as a clutch and is never allowed to slip for any considerable period of time, yet, which is light and small to reduce inertia effects.

A further object of the present invention resides in providing a single plate clutch wherein the friction material is attached to the parts comprising the housing so that the disk will act as a friction surface and as a consequence will quickly heat up when slippage occurs.

More broadly stated, it is an object of the present invention to provide a clutch designed for constant engagement which will slip under excessive load and if excessive load is maintained for an abnormal period of time will automatically complete the disruption of the driving connection.

Another object of the present invention resides in providing a clutch, designed for constant engagement, with manual means normally maintained in an inoperative position but designed to be moved to effect the disconnection of the driving and driven elements of the clutch to thereby permit the unit driven thereby to be freely rotated for testing or like purposes.

A further object of the present invention resides in providing a clutch, of the character described, that may be quickly and easily opened or dismantled for replacement and repair purposes.

A still further object of the present invention resides in providing a clutch with means designed for cooperation with a novel tool which is used to remove the clutch from its supporting shaft.

Additional objects will appear from the description when read in conjunction with the appended claims and the accompanying drawings, wherein:

Figure 1 is a longitudinal sectional view of the novel clutch of the present invention.

Figure 2 is a fragmental sectional view showing one of the driving pins utilized for driving the movable driving plate of the clutch of the present invention.

Figure 3 is a side view illustrating a drive for a railway car generator, or like unit, comprising a preferred mode of employing the clutch mechanism of the present invention.

Figure 4 is a sectional view through a novel hub puller designed for association with the central hub of the clutch of the present invention for the purpose of removing the clutch from the generator armature shaft.

Figure 5:
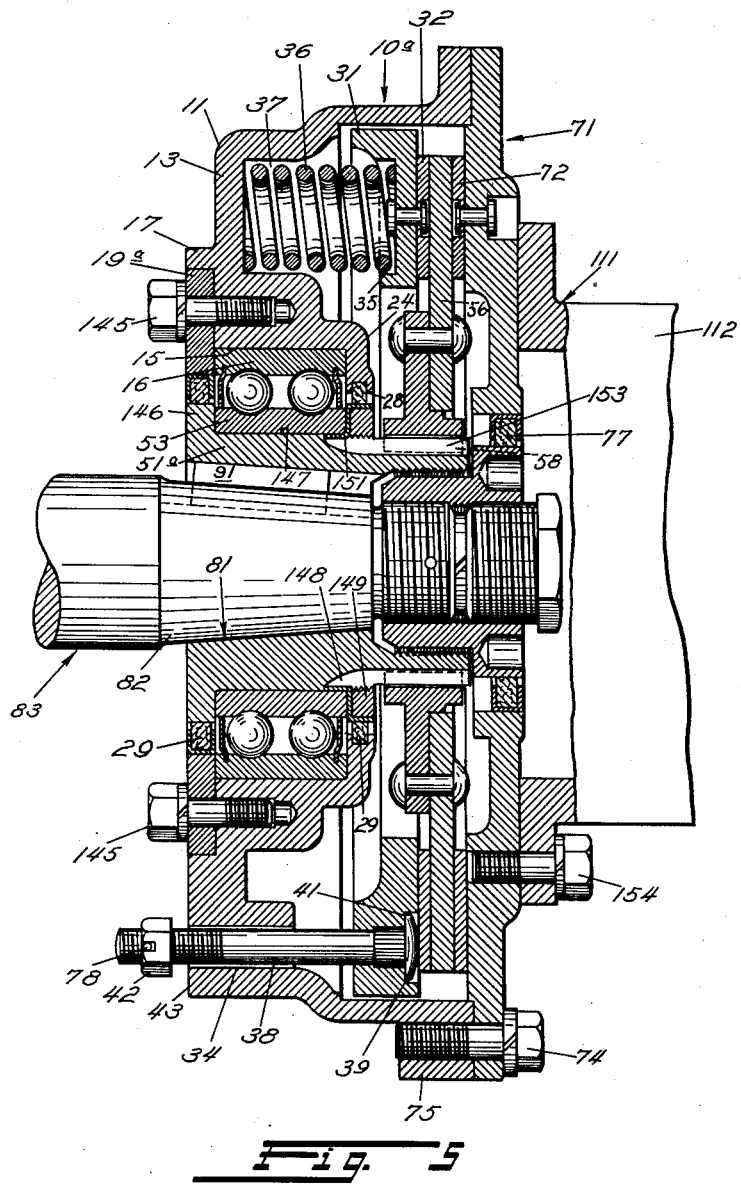
Figure 5 is a longitudinal sectional view, taken through a modified form of clutch made in accordance with the present invention.

With continued reference to the drawings wherein like reference characters are utilized throughout the several figures, and with particular reference to Figure 1, the numeral 10 is used to designate the clutch of the present invention in its entirety.

Clutch 10 comprises a clutch housing 11 of general cup shape having an open side 12 and a substantially closed side including a wall 13. Wall 13 adjacent its center is provided with an annular bearing seat 15 designed to receive a double ball or like bearing 16 of any suitable design. Bearing 16 is preferably of the oil sealed type, so that periodic lubrication thereof will be unnecessary.

An annular flange 17 is formed on the outer face of wall 13. The inner surface of flange 17 and the bounded surface 18 of wall 13 are preferably machined to provide a snug fit with plate 19 which is designed to fit within flange 17 and lie flush against surface 18. An annular boss 21 formed on the inner face of plate 19 is designed to abut the exposed edge 22 of the outer race of bearing 16 and clamp it against a similar boss 23 formed on inwardly directed flange 24 of wall 13. Suitable studs 25 having annular enlarged portions 26 fitting within recesses 27 in plate 19 secure plate 19 to housing 11. Plate 19 and flange 24 are provided with aligned central openings 28 which receive sealing washers 29 designed to exclude dirt and foreign matter from the area surrounding bearing 16.

A gripping or reaction plate 31 having friction wear surfaces 32, preferably of low heat conductivity, secured thereto by means of rivets 33, or the like, is designed to be mounted in housing 11. To this end housing 11 is provided with apertures 34 and recesses 35. While any desired number of apertures and recesses may be employed, it is preferable to provide four apertures and eight recesses. Suitable springs 36 having one end disposed in recesses 35 and their opposite ends disposed in similar recesses 37 formed in plate 31 are disposed between plate 31 and wall 13 of housing 11. Bolts 38 having their heads 39 secured in apertures 41 formed in plate 31 extend through apertures 34 provided in housing 11 and receive castellated nuts 42. Nuts 42, at this time, are preferably threaded on bolts 38 into abutting engagement with bosses 43 formed on the outer surface of wall 13. Continued threading of nuts 42 draws plate 31 toward wall 13 and compresses springs 36 to maintain plate 31 and springs 36 in position within housing 11. Although bolts 38 may be utilized to maintain the several parts in the relation described, it is to be understood that this is not the primary function of bolts 38. Accordingly, any other suitable means may be employed to retain plate 31 and springs 36 in their proper position while the rest of the clutch is being assembled.

Since plate 31 is designed to rotate with housing 11, it is essential that a suitable driving connection between these members be provided. For this purpose plate 31 is provided with peripheral notches 44 which are designed to receive heads 45 of driving pins 46 which are secured in apertures 47 formed in suitable bosses 48 on the periphery of housing 11. It is contemplated that any desired number of driving pins may be used although four such pins are preferred. Such a driving connection is well known in the clutch art and does not constitute a part of the present invention, since any other suitable connection between these parts may be employed.

A hub 51 having a reduced end 52 is inserted from the open side 12 of housing 11. Reduced end 52 is designed to effect a forced fit within inner race 53 of bearing 16. An enlarged portion 54 is provided on hub 51 adjacent its reduced end and performs two functions, namely, to limit the insertion of hub 51 within bearing 16 due to its abutment with inner race 53 and to cooperate with seal 29 of flange 24 to prevent dust, or other harmful substances from entering the area surrounding bearing 16. Hub 51 adjacent portion 54 is provided with raised splines 55 which are designed to cooperate with the novel torque transmitting member 56 of the present invention.

Member 56 comprises a hub 57 having splines 58 designed to cooperate with splines 55 of hub 51. Hub 57 is provided with an outwardly extending annular flange 59 in which a plurality of apertures 61 are provided. Adjacent the inner edge of flange 59 a shallow seat 62 is formed and functions to receive and center friction disk 63. Disk 63 is provided with apertures 64 which are aligned with and correspond in number and size to apertures 61. As seen in Figure 1, disk 63 extends beyond flange 59 to engage with facing 32 of plate 31.

Hub 57 and disk 63 are secured together by rivets 66 which are designed to be positioned in apertures 61 and 64. Rivets 66 are preferably formed of any suitable metal or metal alloy—such, for example, as zinc combined with relatively small percentages of one or more metals such as tin, copper and aluminum—which exhibits reasonably high resistance to shearing forces at normal temperatures while having a sufficiently low melting point to permit disk 63 and hub 57 to function to transmit driving torque only until the heat due to abnormal slippage has weakened or softened the rivets and thereby lowered their shear resistance to a point where disk 63 and hub 57 are disconnected. It will be appreciated that the material used for rivets 66 as well as the rivet sizes may be varied according to the size of the clutch and the loads to be transmitted, and also that other types of destructible connections may be substituted for the rivets—for example the clutch plate and hub may be joined by solder which will afford a disrupted connection under abnormal temperature conditions. In the disclosed embodiment of the invention the material used preferably has a melting point within a temperature range between 500° F. and 800° F., but it is possible to select materials that have thermal shear points within the range 200° F.–1000° F. for satisfactory results under various conditions.

A cover plate 71 having friction facings 72, of material like that used for facings 32, secured thereto by rivets 73, is provided for closing side 12 of housing 11. Suitable cap screws 74 secure cover 71 to flange 75 of housing 11. Friction facings 72, as seen from Figure 1, are disposed in alignment with facings 32 and the peripheral portion of disk 63. Due to the novel disposition of facings 32 and 72 on either side of disk 63, the heat due to slippage of clutch 11 will be confined to disk 63 to thereby assure the transmission of the generated heat to rivets 66.

Cover 71 is provided with a central aperture 76 in which a seal ring 77, designed to prevent entrance of foreign matter into the interior of clutch 10, is positioned. It will be clear, therefore, that the interior of clutch 10, due to seals 29 and 77, is completely sealed against entrance of cooling air, harmful grit, dust and the like. These seals, therefore, to a large extent confine the generated heat within the clutch assembly.

If nuts 42 have been screwed down to retain plate 31 and spring 36 in position during assembly, they may now be loosened so that springs 36 will force plate 31 to the left and clamp disk 63 between faces 32 and 72. Since the present clutch is designed to operate as a constantly engaged clutch, nuts 42 are backed off a sufficient distance to preclude their contacting bosses 43 during normal clutch operation. A suitable locking pin 78, such as a cotter pin, is provided for retaining nuts 42 in their normal inoperative position.

Clutch 10 in its present stage of assembly forms a constantly engaged clutch, i. e., a clutch which is maintained in engagement under normal operating conditions. Clutch 10 may be conveniently connected to either a driving or driven shaft in the following manner. Hub 51 is provided with a central, tapered bore 81 which is designed to receive a correspondingly tapered end 82 of a shaft 83, which in the present form of the invention, constitutes the armature shaft of a generator 84. Generator 84, as shown in Figure 3, is connected to the underside of a rail car or other like vehicle 85 by means of U-bolts or straps 86. A suitable keyway 87 formed by complemental grooves 88 and 89 in hub 51 and tapered end 82 of shaft 83 receives a key 91, which serves to connect hub 51 and shaft 83 in driving relation.

A suitably tapped nut 94 having an abutment shoulder 95 is threaded on the end 96 of shaft 83 for the purpose of retaining clutch 10 upon shaft 83. Shoulder 95 is designed to engage inner race 53 of bearing 16 to securely clamp bearing race 53 against enlarged portion 54 of hub 51 and force clutch 10 upon tapered end 82 of shaft 83. The peripheral face 97 of nut 94 adjacent shoulder 95 engages seal 29 to prevent foreign matter from reaching bearing 16 or the interior of clutch 10. Recesses 98 are provided in nut 94 and are designed to receive a suitable spanner wrench or other like tool for properly tightening nut 94.

A split lock washer 101 is provided for use with nut 94 and is designed to cooperate with a lock nut 103 to provide a novel locking assembly designed to function in the following manner: After nut 94 is screwed home washer 101 is disposed in bore 102 and nut 103 is threaded therein forcing washer 101 against rounded end 105 of shaft 83. As nut 103 is tightened, shaft 83 is forced to the left and nut 94 is forced to the right, as seen in Figure 1. This action wedges the mating threads of shaft 83 and nut 94 to effect the locking of nut 94. At the same time, washer 101 is clamped between rounded end 105 of shaft 83 and end 106 of nut 103. As a result of this clamping action, the ends of split washer 101 bite into rounded end 105 of shaft 83 and end 106 of nut 103 to lock nut 103 in place. It will be clear, therefore, that this novel assembly serves to lock both nuts 94 and 103 in their final adjusted positions.

With clutch 10 secured to armature shaft 83 as described above, housing 11 is connected to a driving member 111 which, in the present application, comprises housing 112 of a universal joint 113 of any suitable construction. Although member 111 is here described as a driving member, it will be apparent that member 111 may be a driven member when shaft 83 is connected, as may be desirable, but not shown, to a driving unit.

Housing 112 is preferably secured to clutch 10 by nuts 114 which are threaded on threaded ends 115 of studs 25. Ends 115 are designed to protrude through suitable apertures 116 provided in flange 117 of housing 112. Apertures 116 are designed for alignment with studs 25 in order that these studs may serve the dual function of securing plate 19 to housing 11 and housing 112 to clutch 10. The other member of universal joint 113 is connected to a drive shaft 121 in any well known manner.

Shaft 121 is connected through a second universal joint 122 and a power take-off unit 126 to a source of power, which, as disclosed in the present application, is axle 123 of traction wheels 124. Axle 123 and wheels 124 form parts of railcar truck 125 which may be connected in conventional manner to car 85.

Operation

When the car 85, having clutch 10 and generator 84 connected thereto as described above, is placed in motion the wheels 124 and axle 123 are accelerated and, through drive shaft 121 and driving member 111, serve to drive housing 11, cover 71 and plate 31 of clutch 10. Springs 36, as pointed out above, constantly force plate 31 toward cover 71 and grip the torque transmitting member 56 between friction facings 32 and 72 to establish a normally unyielding connection between the driving and driven members of clutch 10. As a consequence, shaft 83 and armature of generator 84 are accelerated to generate electric current for supplying the necessary power for lights, fans or other auxiliary equipment carried by car 85.

In order that the drive connection between generator 84 and wheels 124 will slip when abnormal resistance to rotation is encountered, springs 36 are preferably made of a strength sufficient to maintain non-slipping engagement of facings 32 and 72 with member 56 only under normal load conditions, i. e., the load to be overcome in driving armature 84 to efficiently generate current. It will, therefore, be apparent that any normal overload, such as that encountered due to the sudden shock of coupling car 85 in a train of cars, or other similar shocks, or binding of parts, will cause disk 56 to slip with respect to facings 32 and 72. Normal excess loads of the character mentioned, however, will be of short duration and as a consequence the critical temperature necessary for softening rivets 66 will not be reached.

If, on the other hand, the armature should jam or the power line should be excessively overloaded for a period of long duration, or the driven elements of the clutch should for any other reason have excess loads imposed thereon for an abnormal period of time, clutch 10 will slip substantially continuously and the heat generated will be substantially localized in the disk 63 and very rapidly conducted therethrough for concentration adjacent the rivets until the critical temperature is reached at the rivets. Upon the attainment of this critical temperature rivets 66 will soften and the strain incident to disk 56 driving hub 57 will shear them and disrupt the drive connection. Disk 56 will then remain in engagement with facings 32 and 72 but no torque will be transmitted therefrom to hub 57 and the driven members connected thereto. The novel clutch provided by this invention will, therefore, satisfactorily transmit torque under normal loads and overloads, and disrupt the transmitting connection when abnormal excessive loads are encountered, thereby preventing serious damage to the generator or any of the driving or driven mechanism.

After clutch 10 has disrupted the driving connection in the manner described above, car 85 may be side-tracked and the cause of the clutch failure may be ascertained and corrected. After the necessary repairs to the generator or other unit have been completed, clutch 10 is disconnected from universal joint 113, removed from shaft 83 and plate 63, with rivets 66 intact, replaced. In order that clutch 10 may be expeditiously serviced the present invention provides a novel tool 131 for disassociating the clutch and shaft 83.

Tool 131, as shown in Figure 4, comprises a body portion 132 having a central bore 133 and a reduced threaded portion 134 adjacent one of its ends. The other end of body portion 132 has a central threaded opening 135 of a lesser diameter than bore 133. Opening 135 is designed to threadedly receive a bolt 136 having a hexagonal head 137 and a conical, hardened tip 138. Bolt 136 is preferably of sufficient length to extend through bore 133 with tip 138 protruding beyond threaded end 134 before bolt 136 reaches its extreme position.

In using tool 131 universal joint housing 112, locknut 103, and nut 94 are removed. Threaded portion 134 of tool 131 is then inserted in the opening resulting from the removal of nut 94, and threads 134 are engaged with threads 141 provided within bore 81 of hub 51. At this time, bolt 136 is in its retracted position with tip 138 well within the confines of bore 133. Body portion 132 is then securely engaged with hub 51 by use of a suitable wrench which is designed to fit the preferably hexagonal outer surface 142 of body 132.

After hub 51 and tool 131 are securely engaged bolt 136 is advanced by means of a wrench designed to fit head 137. Tip 138 due to the advancement of bolt 136 engages end 105 of shaft 83 and upon continued operation of bolt 136 forces hub 51 and shaft 83 in opposite directions. This relative movement of shaft 83 and hub 51 results in axial movement of clutch 10 due to the contact between enlarged portion 54 of hub 51 and bearing race 53 of bearing 16. After clutch 10 is moved sufficiently to break the tight connection with shaft 83, clutch 10 with tool 131 secured thereto may be grasped with the hands and removed. It will be apparent that clutch 10 is singularly designed for use with tool 131 and as a consequence means for expeditious disassembly of clutch 10 and shaft 83 is provided by this novel construction of hub 51 and tool 131.

With clutch 10 removed as pointed out above, a new clutch may be substituted and connected to shaft 83 and universal joint 113, thereby rendering car 85 ready for immediate use. If desired, clutch 10 may be provided with a new member 56 in a very short time merely by disengaging plate 31 by operation of nuts 42 on bolts 138. To accomplish this, nuts 42 are screwed down upon bosses 43. Plate 31 through bolt heads 39 will be drawn toward wall 13 of housing 11 at the same time compressing springs 36. After plate 31 and disk 63 are disengaged cover 71 may be removed and a new torque transmitting member 56 inserted. Upon replacing cover 71 and releasing plate 31 by reverse operation of nuts 42 the old clutch will be ready for immediate use and may be again connected in driving relation between shaft 83 and universal joint 113.

From the above description, it will be clear, that, due to the novel clutch construction and its simple connections to shaft 83 and drive shaft 121, the present invention makes it possible to rapidly and easily replace or repair clutch 10. The only elements of clutch 10 that will be damaged when trouble is encountered are rivets 61. As a consequence no heavy expensive clutch parts need be kept on hand since new rivets 61 may be inserted to connect the disk 63 and hub 57 and clutch 10 will again be ready for use.

While bolts 38 and nuts 42 have been described as being used in originally assembling clutch 10 or for replacing member 56, their primary function is to provide a ready declutching means for permitting generator 84 or any other unit connected in place thereof, to be freely rotated for test, repair or adjustment purposes. Under such circumstances nuts 42 are operated as described above to disengage member 56 by withdrawing plate 31. Generator 84, shaft 83 and member 56 may then be freely rotated for any desired purpose.

Although clutch 10 has been described for use with a generator or like drive, it will be apparent that it may be used wherever a slipping clutch is desired. In this connection, it is to be understood that the material used in manufacturing rivets 61 may be chosen so that it will withstand the normal temperatures resulting from slippage of member 56 in the particular combination in which clutch 10 is used. It will also be appreciated that bolts 38 may be utilized in connection with any well known throwout bearing construction to convert clutch 10 from a constant engagement clutch to a manually controlled closed clutch.

In order to expedite the removal and replacement of the driven plate, the modified structure shown in Figure 5 is provided, and in many cases is preferable to the other form. In this form of the invention clutch 10a is turned end for end so that cover 71 is disposed to the right. Since the major parts of the clutch are the same the same reference numerals will be used to indicate these parts in the description of the present modification.

Clutch 10a comprises a clutch housing 11 which, like that previously described, includes a wall 13 and a bearing seat 15 for receiving a bearing 16. A flange 17, snugly receiving a plate 19a similar in function to the plate 19 of the previously described form, is also provided. Cap screws 145 secure plate 19a in place within the flange 17. Reaction plate 31 having friction wear surfaces 32, of low heat conductivity and secured to the plate by means of rivets 35, is mounted in housing 11 in the manner previously described.

A hub 51a having an enlarged annular flange 146 is inserted through opening 28 in flange 24 of wall 13. The flange 146 is designed to abut one end of inner race 53 of bearing 16 which is carried on bearing seat 147 provided on hub 51a. Hub 51a adjacent the other end of race 53 is suitably threaded at 148 to receive a nut 149 which is tightened to securely clamp race 53 of bearing 16 against flange 146 and secure hub 51a to bearing 16. A suitable lock washer 151 retains nut 149 in adjusted position.

The end of hub 51a opposite flange 146 is provided with suitable splines 153 the outer edges of which are slightly offset with respect to bearing seat 147 in order that hub 51a may be readily inserted in bearing 16. Splines 153 are adapted to receive splines 58 of torque transmitting member 56 in the manner previously described. After member 56 has been assembled, the cover 71 with its friction face 72 attached thereto is secured in place over open side 12 by means of suitable cap screws 74 which are threaded into bosses 75 formed on housing 11.

Clutch 10a is then connected, by means of tapered bore 81 in hub 51a, to the drive shaft 83 in the manner previously described. With clutch 10a connected to shaft 83 cover 71 is connected to housing 112 of universal joint 113. Suitable cap screws 154 threaded into cover 71 secure cover 71 to universal joint 113.

In the event member 56 of modified clutch 10a is disrupted during operation in the manner previously described, its replacement can be very expeditiously accomplished by merely loosening screws 74 and sliding universal joint housing 112 and cover 71 along the usual longitudinal universal joint splines until cover 71 clears nut 103. Cover 71 and universal joint 113 may then be moved out of alignment with housing 11 and the necessary replacements in clutch 10a may be made through the exposed open side 12. Accordingly, the present form of the invention provides a very convenient arrangement for inspecting the clutch mechanism, or for removing and replacing the clutch plate or other internal parts.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A clutch of the type designed to slip under excess loads only comprising a driving member, a driven member, heat responsive means included in one of said members and designed to withstand heat generated under normal slippage, and a casing designed to enclose said members and prevent the passage of a ventilating draft whereby heat due to slippage will be concentrated upon said means to effect a disruption of the driving connection should abnormal slippage occur.

2. In a clutch the combination of a torque transmitting member including separable sections; means of relatively low melting point connecting said sections and designed to transmit torque from one to the other; a second torque transmitting member composed of a stationary part and a movable part; friction faces disposed on said stationary and movable parts in position to engage the opposite sides of one section of said first mentioned member; yielding means designed to engage said movable part and maintain said friction surfaces in engagement with said one section of said first mentioned member to effect a yielding torque transmitting connection designed to slip when overloading occurs; a housing enclosing said members and preventing the passage of a ventilating draft; means for driving one of said members; means driven by the other of said members; and means, including said facings, said section of said first mentioned member and said housing for concentrating the heat generated by slippage of said members in the locus of said connecting means to thereby soften said means and disrupt the driving connection through said clutch when abnormal slippage of said clutch occurs.

3. A clutch comprising driving and driven members, friction facings of relatively low heat conductivity secured to one of said members, and designed to engage a part of said other member therebetween, said other member including at least two sections one of which is of relatively high heat conductivity and which contains the part engaged by said facings, rivets of relatively low melting point interconnecting said sections, yielding means designed to cause said facings to grip said sections to effect a torque transmitting connection capable of slipping and generating heat only when overloaded, and a clutch housing designed to prevent the passage of a ventilating draft through said clutch into cooling contact with said rivets and said section of high heat conductivity.

4. A safety clutch for use in a direct drive connection comprising driving and driven members designed for driving engagement, one of said members including separable sections, means for permitting said members to slip when overloaded, heat responsive means connecting said sections beyond the area of engagement and means for confining the heat generated during slippage in the locus of said heat responsive means and thereby softening said heat responsive means to disrupt the driving connection when a predetermined high temperature is reached.

5. In combination a rotatable element, and a clutch comprising driving and driven members; one of said members including an open sided housing mounted on said rotatable element, a cover for closing said open side of said housing and means securing said cover to said housing; clutch mechanism within said housing; a contractible torque-transmitting shaft fixed to said cover; said cover securing means being disconnectible to permit said cover and said shaft to be moved away from said housing and said clutch mechanism to expose the interior of the latter in order that internal repairs and replacements may be made without removing the clutch housing from said rotatable element.

CLARENCE W. SPICER.